(12) United States Patent
Saraswat et al.

(10) Patent No.: US 6,417,943 B1
(45) Date of Patent: Jul. 9, 2002

(54) LOW-LATENCY HIGH-BANDWIDTH TDM-WDM NETWORK AREA NETWORK ARCHITECTURE

(75) Inventors: Sanjay Saraswat, Ottawa; Simon Boothroyd, Orleans; Jacek Chrostowski, Gloucester, all of (CA)

(73) Assignee: National Research Council of Canada, Ottawa (CA)

( * ) Notice: Subject to any disclaimer, the term of this patent is extended or adjusted under 35 U.S.C. 154(b) by 0 days.

(21) Appl. No.: 09/315,830

(22) Filed: May 21, 1999

Related U.S. Application Data

(60) Provisional application No. 60/086,575, filed on May 22, 1998.

(51) Int. Cl.$^7$ ............................................. H04J 4/00

(52) U.S. Cl. ..................... 359/123; 359/124; 359/135

(58) Field of Search ................................. 359/123, 124, 359/135, 154, 173, 120–121

(56) References Cited

U.S. PATENT DOCUMENTS

| 5,864,415 A | | 1/1999 | Williams et al. ............. 359/125 |
| 5,953,143 A | * | 9/1999 | Sharony et al. ............. 359/128 |

OTHER PUBLICATIONS

"Time–Deterministic WDM Star Network for Massively Parallel Computing in Radar Systems" M. Jonsson, et al. *Proc. Massively Parallel Processing using Optical Interconnections* Oct. 27–29, 1996 .pp. 85–93.

"On Inter–Cluster Communication in a Time–Deterministic WDM Star M. Jonsson and B. Svensson Network" www.hh.se/cca.

"Demonstration of a Multiple–Access WDM Network with Subcarrier–Multiplexed Control Channels" S.F. Su et al. *IEEE Photonics Technology Letters* vol. 6 No. 3, pp 461–463, Mar. 1994.

"A 200Mb/s Packet–Switched WDM–SCM Network Using Fast RF Tuning" M.N. Choy et al. SPIE, vol. 1787, *Multigigabit Fiber Communications*, pp. 32–42, 1992.

"Subcarrier multiplexing for multiple–access lightwave networks" T.E. Darcie *Journal of Lightwave Technology* vol. LT–5, No. 8, pp. 1103–1110, Aug. 1987.

"Multiaccess Processor Interconnection Using Subcarrier and Wavelength Division Multiplexing" Chen–Ken Do, and Sy–Yen Kuo *Journal of Lightwave Technology* vol. 15, No. 2, pp. 228–241, Feb. 1997.

(List continued on next page.)

*Primary Examiner*—Kinfe-Michael Negash
(74) *Attorney, Agent, or Firm*—Freedman & Associates (57) ABSTRACT

A low-latency, high-bandwidth, hybrid TDM/WDM architecture for connecting processing nodes into a high-performance computing environment designed as a system area network is disclosed. Each node has a receiver for receiving optical communication within a fibre at all wavelength channels supported by the system simultaneously and individually. Each node also has a transmitter for transmitting at at least two wavelengths. One of the wavelengths is a default wavelength for the node. In order to transmit data, a node requests a channel and is provided with a transmit wavelength at which to transmit data. Other nodes receive the data and, when the recipient is the addressee of the data, the data is then forwarded to a computing device connected to the node or in communication therewith. The architecture provides robust communication with high bandwidth.

27 Claims, 9 Drawing Sheets

OTHER PUBLICATIONS

"Optical Networking Update" P.E. Green, Jr. *IEEE Journal on selected areas in Communication* vol. 14, No. 5, p. 764–779, Jun. 1996.

"A Wavelength Division Multiple Access Network for Computer Communication" N.R. Dono et al. *IEEE Journal on selected areas in Communication* vol. 8, No. 6, pp. 983–994, Aug. 1990.

"All–Optical Network Consortium—Ultrafast TDM Networks" R.A. Barry et al. *IEEE Journal on Selected areas in Communications* vol. 14, No. 5, Jun. 1996 pp. 999–1013.

"High Performance Virtual Machines (HPVM): Clusters with Supercomuting APIs and Performance" A. Chien et al. *University of Illinois at Urbana–Champion* www–csag.cs.uiuc.edu.

"Multi–stage wavelength converters using semi–conductor optical amplifiers" Z.G. Lu et al. *The Second Canadian Conference on Broadbank Research*, Jun. 21–24, 1998 Ottawa.

\* cited by examiner

Fibre channel control for out-of-band signaling

LOW-LATENCY HIGH-BANDWIDTH TDM-WDM NETWORK AREA NETWORK ARCHITECTURE

This application claims benefit of Prov. No. 60/086,575 filed May 22, 1998.

FIELD OF THE INVENTION

The present invention relates to the field of optical communication and more particularly to a network-architecture for providing broadband communication between nodes.

BACKGROUND OF THE INVENTION

Real-time computing applications make severe demands on both the computing and the communications infrastructure. Although the computing power offered by a single machine continues to increase, the complexity and scope for real-time applications has grown at a much faster rate. Most real-time applications such as RADAR processing, multimedia, medical imaging diagnostics, image processing, large database searching. tele-presence, and virtual reality require computing power beyond the capabilities of a single processing node.

In an effort to satisfy this demand a number of specialised parallel architectures have been built. However, most of these architectures were designed to have a fixed interconnection topology, often favorable to a particular type of application, with little flexibility for growth. As a result of this, recent approaches to interconnecting multiple independent processors are evolving away from a rigid parallel architecture towards a system area network. Interconnecting high performance computers in a system area network (SAN) has the potential to provide supercomputer performance to the desktop and access to new application areas which are beyond the computing power of an individual node. For example, tasks such as distributed database searching, multiple video streaming, and medical image searching-can be performed from any of a number of nodes taking advantage of computing resources throughout the network.

Latency is an important issue for interconnection in such an environment, particularly for applications where the expected communication between the nodes is high. Recent progress in optical broadband networking has shown a way to solve this problem and to assemble real-time computing power with low complexity and with high growth capability using a gigabit all-optical network. In particular, wavelength division multiplexing (WDM) has increased the useable bandwidth on a single fibre many times and is starting to influence the design of high performance networks.

In a common WDM star coupler based architecture, each node is provided with a single transmitter frequency and a plurality of receiver frequencies. The transmitter transmits at one fixed carrier frequency or wavelength channel. Hence, the maximum number of nodes remains related to the number of frequencies and the bandwidth to a node remains limited to the bandwidth of a frequency channel. Moreover, every node has a unique frequency assigned thereto. The number of nodes in the network is limited by the number of frequencies that are supported by the network. The resulting system becomes expensive, unscalable, and difficult to build for a large number of network nodes as is typically required.

OBJECT OF THE INVENTION

In order to overcome these and other shortcomings of the prior art, it is an object of the invention to provide a star coupler based network architecture for high-bandwidth communication where a number of nodes in the network is not limited by a number of available frequency channels.

SUMMARY OF THE INVENTION

In accordance with the invention there is provided a communication node for use in a multi-wavelength optical communication network supporting communication at each of W wavelength wherein W>2 comprising: an optical transmitter for transmitting data at each of a plurality of wavelengths the number of wavelengths less than the number W but greater than 1; an optical receiver for simultaneously receiving signals transmitted at each of the W wavelengths; and, control logic for dynamically allocating transmitter wavelength for use in providing a dedicated transmission channel from the node to another node within the optical communication network.

In accordance with another aspect of the invention there is provided a multi-wavelength optical communication network comprising: a WDM communication network supporting communication in W wavelength channels; N intercommunicating network nodes each including at least a transmitter for transmitting data via the WDM communication network at each of T wavelengths ($0<1\leq W$) and at least a receiver for receiving data transmitted via the WDM communication network on each of W wavelengths, some nodes having transmitters for transmitting at a same wavelength; and, a controller for dynamically allocating a transmit wavelength to a node within the N intercommunicating network nodes.

In accordance with another aspect of the invention there is provided a method of providing an optical communication network comprising the steps of: providing a WDM optical connection between each of a plurality of nodes; providing N intercommunicating network nodes each including a transmitter for transmitting data via the WDM communication network at each of T wavelengths ($0<T\leq W$) and a receiver for receiving data transmitted via the WDM communication network on some of the W wavelengths. Preferably the receiver receives signals on all the W wavelengths simultaneously and individually. Some nodes have transmitters for transmitting at a same wavelength. The method also includes the steps of dynamically allocating a transmit wavelength to a first node within the N intercommunicating network nodes where the transmit wavelength allocation depends upon free wavelengths and transmit wavelengths supported by the transmitter of the first node; transmitting data from the first node to a second node at the allocated transmit wavelength; and, receiving data at the second node at each of the W wavelengths and extracting data directed to the second node.

BRIEF DESCRIPTION OF THE DRAWINGS

An embodiment of the invention will now be described in conjunction with the attached drawings in which like reference numerals designate like items.

DETAILED DESCRIPTION OF THE INVENTION

The present embodiment relates to a low-latency, high-bandwidth, hybrid time division multiplexing/wave division multiplexing (TDM/WDM) architecture for connecting processing nodes into a high performance processing environment. Preferably, it is implemented in an all optical network with deterministic communication latencies, In order to achieve these, a broadcast and select star where each node has access to a number of transmitter and receiver channels is used.

In general, a mandate for a network architecture is to ensure efficient communication between the nodes. Network architecture determines the path between two communicating nodes which largely determines the latency experienced. In most single-cluster star-coupler based architectures, a passive optical star is the central component in a fibre-optic multi-access network with N nodes. All incoming messages to the star are distributed to all nodes in the cluster by dividing the light signal. The transmit interface of a node puts incoming messages into the star whereas the receive interface filters messages present in the star. In most implementations today, transmitter and receiver interfaces either use a fixed-transmitter tunable-receiver (FR-TR) or a tunable-transmitter fixed receiver (IT-ER) configuration, without support for wavelength reuse within the network or multiple access paths between nodes. There are many drawbacks to designs of that type. For example, frequency reuse is unsupported.

According to the invention, a star network architecture providing multiple access paths, i.e., wavelength channels between nodes is used. The architecture has provisions for a use of one wavelength on more than one node enabling wavelength reuse. The network is designed based on evolving dense-WDM (DWDM) components. Components for thirty-two wavelength DWDM systems, with carrier frequencies $f=193.1\pm0.1j$ $TH_2$ and j is a series of integers, are available today. For high speed networks and high performance systems, it is anticipated that single chip laser arrays covering 2 or more of the wavelengths in a 32 wavelength grid and integrated receiver arrays capable of receiving the whole wavelength grid will be available as standard components in the near future.

Definitions

The term node is used herein to indicate a network node. A network node is is a point in a network architecture from which data is transmitted or at which data is received. The node need not be at an end point of the network. For example, when a particular network is used to couple a plurality of sub-networks, each sub-network is coupled to at least a node of the network. Of course, computer systems forming part of a network can also be disposed at nodes of that network.

The term transmitter is used herein to refer to an optical transmitter. Optical transmitters are available for transmitting signals at one fixed wavelength, at a single fixed programmable wavelength, at any of a plurality of wavelengths, or simultaneously at each of a plurality of wavelengths. For example multi-laser modules are capable of transmitting data simultaneously at each of a plurality of wavelengths. Such a transmitter is optionally programmable to determine at which wavelengths signals should be transmittable. Programmability is useful for allowing a single physical node device while supporting varied system designs.

The term receiver is used herein to refer to an optical receiver. Optical receivers are available for receiving signals at one fixed wavelength, at a single fixed programmable wavelength, at any of a plurality of wavelengths, or simultaneously at each of a plurality of wavelength. According to the invention, a receiver capable of receiving a signal transmitted at each of a plurality of wavelengths simultaneously is used. Such a receiver is optionally programmable to determine at which wavelengths signals should be received. Programmability is useful for allowing a single physical node device while supporting varied system designs.

Network Architecture

Figure 1:
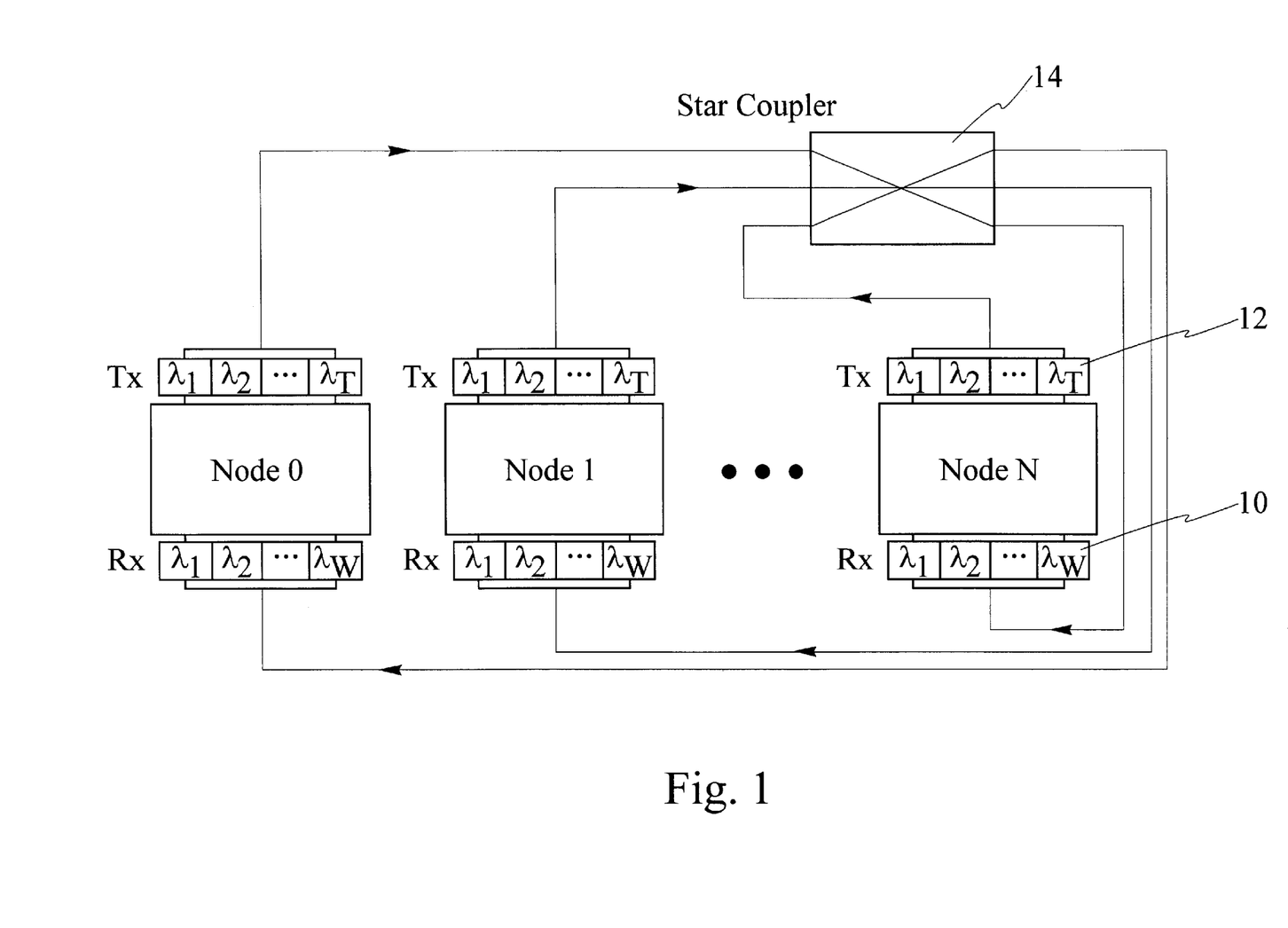
FIG. 1 is a schematic diagram of a network architecture according to the invention.

Referring to FIG. 1 a schematic of a network architecture according to the invention is shown. The receiver interface 10 is an optical demultiplexer separating all the wavelength channels on the network to individual detectors. Preferably, the receiver interface is an optical detector followed by an electronic switching fabric that avoids high latency associated with tunable optical channel receivers. The transmit interface 12 of each node includes a subset of wavelength channels from the wavelength grid, for example 2, 4, or more wavelengths. The architecture allows nodes to transmit using either different or same wavelengths from a pool of wavelengths in the network. Having multiple transmit wavelengths at each node enables the node to support multiple computing devices, each with high bandwidth. Optionally, one or multiple devices on one node connect to one or multiple devices on another node in the network. Further optionally, a computing device has more than one connection with the same or another device when it finds an unused wavelength belonging to its transmitter and when it requires the bandwidth. This provides a node with access to more communication bandwidth than a same node having access to a single wavelength channel. Nodes in the network need not have a same size transmitter array. In fact, it is often desirable to determine nodes that require more transmitters and those requiring fewer transmitters in order to best allocate resources. A star coupler 14 couples signals from all nodes in order to route the signals from any one node to all others.

Figure 2:
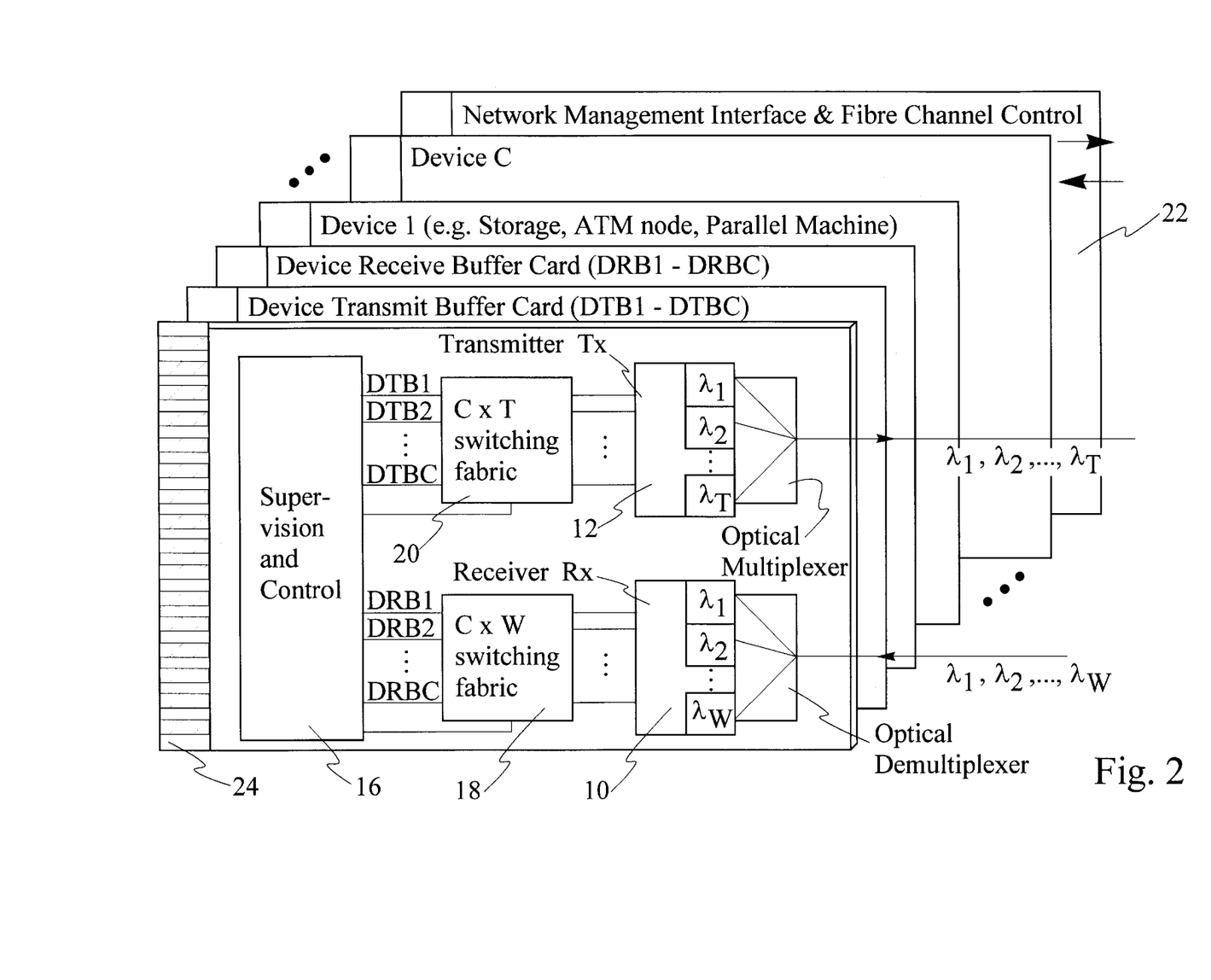
FIG. 2 is a simplified diagram of an individual network node for use in a network according to the invention.

FIG. 2 shows the design of an individual network node. In addition to a receive interface 10 and a transmit interface 12, each node has a supervision and control module 16, a receive switching fabric 18 and transmit switching fabric 20, transmit and receive buffers, a network management interface 22, and backplane connections 24 to computing devices. Within a node the computing devices connect to the transmit interface and to the receive interface through the switching fabric. The medium access protocol (MAC) in the control module provides network control. This MAC protocol implements network signaling, interfaces with the network management card, controls the receive and transmit switching fabric, allocates and monitors wavelengths, facilitates wavelength reuse and establishes communication between two devices on different network nodes. The network control card facilitates the node management, alarm reporting, and out-of-band control of the network as described below.

Network Signaling and Control

Three separate approaches for signaling and control in the proposed network architecture are known: in-fibre in-band, in-fibre out-of-band, and out-of-band using an external communication channel. In the case of in-fibre in-band control, control information is carried along with data packets. Thus rearranging of incoming data packets to insert the control information in a protocol specific manner is performed. Such an approach uses a considerable amount of processing and requires specialized hardware support for high data rates.

In-fibre out-of-band control multiplexes the control information with a data channel. Generally, it uses specialized hardware at each node for filtering the control information associated with each wavelength channel. Allocating one dedicated wavelength channel in the network for control is another alternative for in-fibre out-of-band signaling. However, this requires a particular wavelength be supported by each node of the network.

Figure 3:
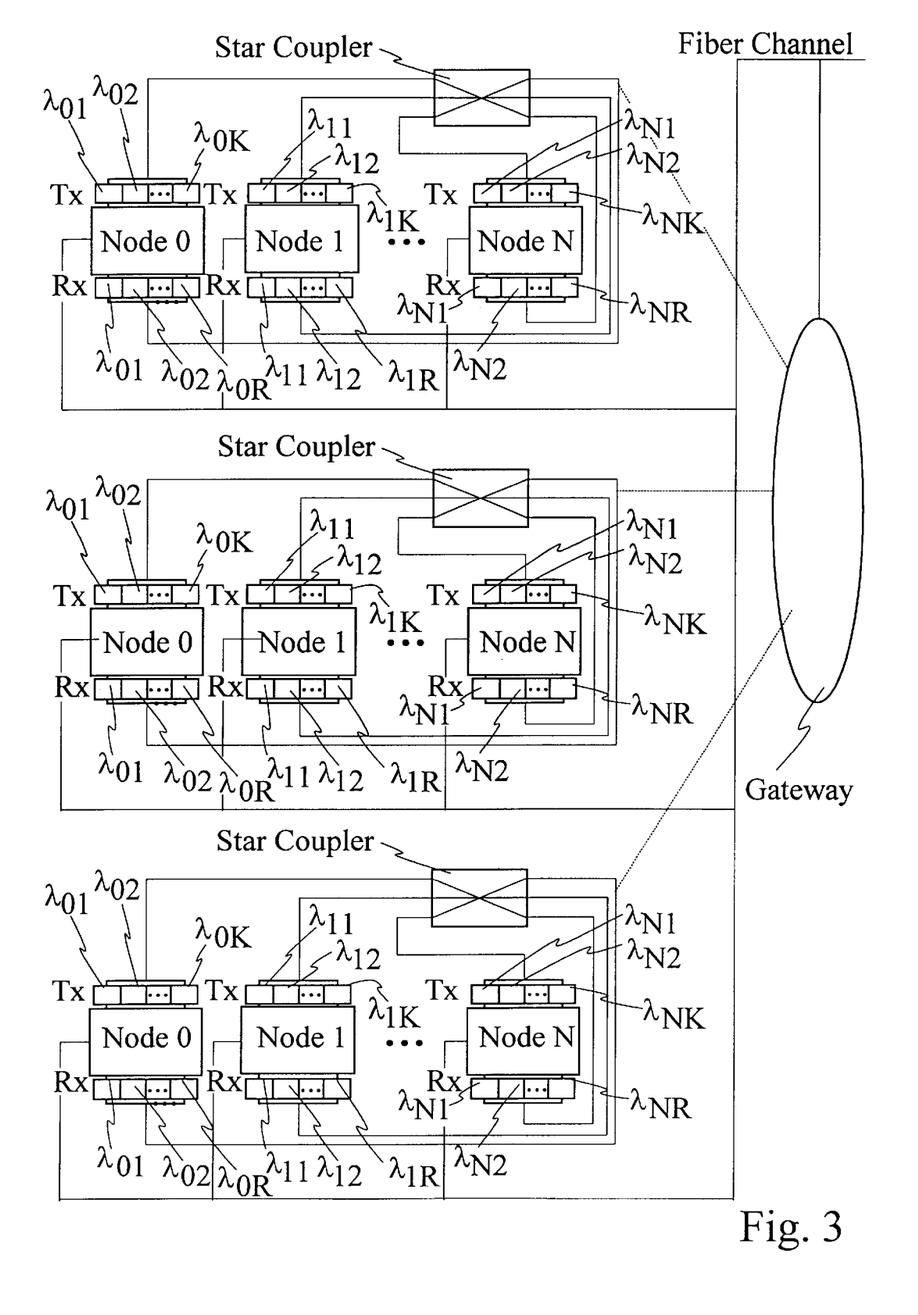
FIG. 3 is a diagram of multiple networks according to the invention coupled by a gateway.

The out-of-band control by an external communication channel requires an additional communication interface and other than this does not need specialized hardware support for each node. Advantageously, with external out-of-band signaling, multiple star sub-networks, as shown in FIG. 3, are optionally supported using a simplified gateway.

Considering the relative merits of each signaling scheme, the external dedicated high-speed out-of-band control for the proposed network, is considered preferable for rapid prototyping of the network architecture. In particular, a specialized interface, for example fibre-channel, for supporting out-of-band communication is used. As shown in FIG. 2, the interface is part of the network management interface card and is used to carry both control and management information. Through this interface the MAC protocol establishes a connection between the nodes.

Medium access Control

The medium access control protocol is designed to establish a data communication channel between devices on different nodes using out of band signaling through reconfigurable logic that allows a connection time ~2 $\mu$sec. This time dominates latency experienced in communicating between devices on the network. Therefore, it is preferred that this time is as short as possible. Wavelength channels are allocated for data transfer through this interface. If the bandwidth demand of a node exceeds that of its one wavelength channel, it accesses other wavelength channels supported by its transmitter. Of course bottlenecks are still possible even with the amount of bandwidth supported by the present architecture. A node gains and releases control of wavelength channels depending on input traffic requests. It is well known that for bursty traffic patterns on a shared network long wait times sometimes occur before a node is provided access to a channel. It is therefore preferred that a unique priority wavelength in the form of a default wavelength is assigned to each node so that long wait times leading to node starvation are avoided. Alternatively, a priority wavelength is assigned to a group of nodes thereby reducing a probability of long wait times and node starvation.

Connection between two devices is established by transferring a control packet through an out-of-band fibre channel connection. In general the control packet contains source node number, source device number, destination node number, destination device number, wavelength channel number and status. The receiving node uses this information to reconfigure its node switching fabric. The wavelength channel determines connection patterns utilised for receive switches and buffers at the destination node. Initiation of the connection is done by the transmit node. In conjunction with the control protocol the network supervision and control logic determines the wavelength and the configuration of transmit switches and device buffers. Preferably, a node attempts to use its priority wavelength by default for data transmission. This provides a guaranteed bandwidth to each node when a unique priority wavelength is assigned to each node. The protocol allows a node to use additional wavelength channels, which are priority wavelengths of other nodes, for a fixed time interval when they are not being used. After this time interval the node releases the additional wavelengths and, when desired, attempts to reacquire them. This time interval, X, determines the worst case time that a node will experience for regaining access to its priority wavelength.

The protocol supported by the network is lightweight and reliable as control signaling takes place over a dedicated channel requiring no acknowledgement from destination devices. This approach was chosen to minimize connection latency. A management protocol interacts with the control protocol providing to the control protocol information about device or node failures. It is evident that a use of one priority wavelength for a number of nodes results in a more complex protocol which, in practice, results in a higher latency.

Of course, any architecture according to the invention assumes that the end devices are capable of fully utilizing a high bandwidth optical channel. Such an architecture is independent of data types so that nodes are interconnected at a desired data rate using any communication protocol. for example ATM, Sonet, Gigabit Ethernet, or fibre channel. Lower data rate devices are capable of sharing a wavelength channel using a switch, for example an ATM switch. Therefore, switches for connecting lower data rate channels are not considered in the model of a network architecture according to the invention presented below; the model is for a case where individual devices utilize one or more wavelength channels for communication across a network. The total network latency to establish a connection is the latency associated with out-of-band control, communication transmission delay through the optical network, and receive and transmit buffer and switch latencies.

Network Modeling

Various network configurations where individual nodes have a laser array with T transmitters and a detector array capable of receiving simultaneously all wavelengths in the network were modeled. Support for 32 wavelengths in the network is included in the model. A series of traffic patterns containing the time a request for bandwidth is made by each device at each node, and the corresponding bandwidth required are used as input data for simulating the model. The number of nodes, N, the laser array size at each node. T, and the traffic request patterns were varied during the simulation. For simplicity the number of devices at a node, C, is assumed equal to the number of transmit wavelengths at each node. Latency for the out-of-band fibre channel interface was assumed as 2 $\mu$secs. A timeout value, X, was chosen according to input traffic patterns. The network model used input traffic conditions and allocated network resources according to the control protocol described above. Results were obtained in terms of average connection latencies, and the waiting time experienced by a node for various network traffic patterns.

To allocate wavelengths at the transmitter of each node, a wavelength allocation function was used in the simulation. This function determined the transmit wavelengths for a node n from the wavelength or frequency grid and is defined by $$f_{ni}=f_{ref}+0.1\ (i+O_n)+0.1\ (n \bmod N)\ THz$$

$f_0 \leq n < N$ and $0 \leq i < T$ and $O_n$ is an integer series defining the offset in the transmit wavelengths of different nodes such that $O_0=0$ and $O_k=O_{k-1}+k$ for $0 \leq k < N$. As an example table I lists the allocated frequencies in the case of an 8 node network with 2, 4, and 8 transmit wavelengths per node. Only frequency channel increments of 100 GHz from the reference have been chosen as an example for this simulation. However, other frequency spacing, such as 50 GHz and frequency channels extending on both sides of the reference frequencies may be used.

TABLE 1

Allocated channels for the N = 8 node SAN, each node has 8 receive wavelengths (R = 8) and multiple transmit wavelengths (T = 2, 4, and 8), $f_{ref}$ = 193.1 THz..

| Number of Nodes (N) | Number of Transmit wavelengths per node (T) | Number of Receive wavelengths per node (R) | Allocated Frequencies |
|---|---|---|---|
| 8 | 2 | 8 | $f_{01} = f_{ref}$ |
|   |   |   | $f_{01} = f_{ref + 0.1}$ |
| 8 | 4 | 8 | $f_{01} = f_{ref}$ |
|   |   |   | $f_{01} = f_{ref} + 0.1$ |
|   |   |   | $f_{02} = f_{ref} + 0.2$ |
|   |   |   | $f_{03} = f_{ref} + 0.3$ |
| 8 | 8 | 8 | $f_{01} = f_{ref}$ |
|   |   |   | $f_{01} = f_{ref} + 0.1$ |
|   |   |   | $f_{02} = f_{ref} + 0.2$ |
|   |   |   | .... |
|   |   |   | $f_{07} = f_{ref} + 0.7$ |

The total latency of the physical network depends on the out-of-band communication latency, latencies of the buffer and switches, and the time for transmission across the optical link. A typical set-up time for the receive switch and buffer is ~30 ns. In a system area network the distance between devices is short and could vary between a few meters aid several hundred meters. Since, for a given topology the optical transmission delay is a fixed delay, it has been neglected in the latency calculations for more general interpretation of simulation results. The operational latency in these simulations is influenced by the connection time, traffic pattern, and the channel availability.

Network performance was simulated for a number of operational conditions. In a first case demands for network bandwidth fall within a limit of the total network capacity. A second case considers a slightly overloaded network where a few devices per node make requests for high bandwidth. In a third case different network topologies are considered where the number of transmitters per node is varied.

Network Modeling Performance Results

Figure 4:
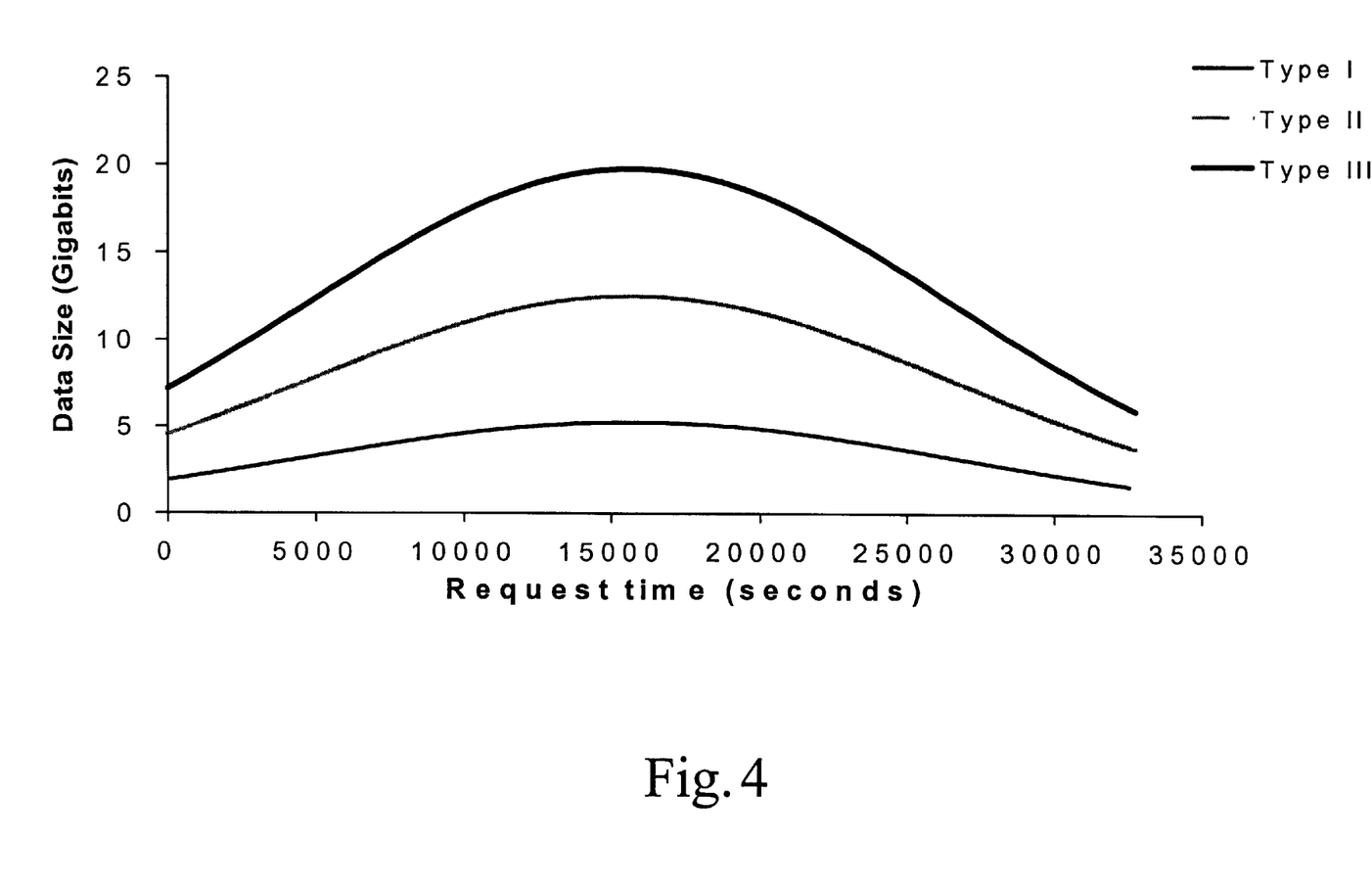
FIG. 4 is a graph of traffic request patterns for node devices used in simulations.

Three different input traffic request patterns were used in the simulations. For these patterns the input request times were generated using a uniformly distributed random number whereas the associated bandwidth value was generated by a Gaussian distribution function. The distribution of bandwidth demand requirements for a node is shown in FIG. 4. Requests are made randomly and with equal probability along the time axis in FIG. 4. These "bandwidth" requests lead to transmitting Gbits of data as shown on the y-axis in FIG. 4. 20,000 requests per node were used in the simulations. The bandwidth of each wavelength channel was set at 2.5 Gb/sec.

Preferably a number of receive wavelengths R supported by a node is equal to the number of wavelengths W supported by the network. Alternatively, R is less than W and only a portion of the available wavelengths are received by a single node.

Figure 5:
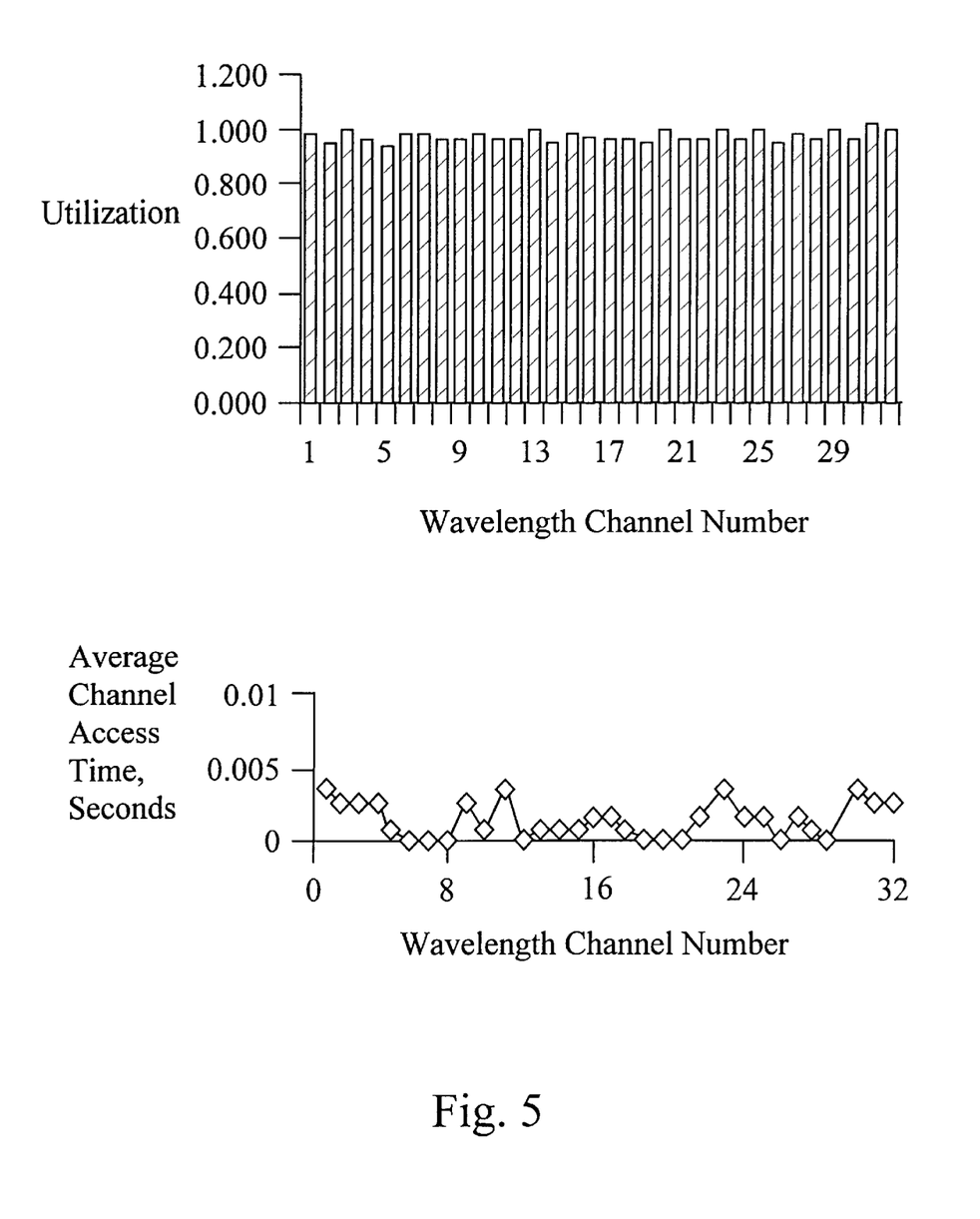
FIG. 5 is a graph of relative wavelength utilisation.

Case 1 was simulated for T=4, N=32, W=R=32, x=2 sec, and the traffic pattern is type I as shown in FIG. 4. In this case the traffic demand does not exceed the bandwidth available from the node's priority channel. Each of the 32 nodes takes one wavelength from the 32 wavelengths available as its priority channel. Each node is capable of accessing four contiguous channels where wavelength p is assigned as the 1 st transmitting wavelength of node p. Commonly, the first transmitting channel is a node's priority channel. The simulation result shows that average connection latency is uniform for all network nodes, equal to 2.03 $\mu$s. This is due to one communication on the fibre channel network to establish a connection. Furthermore, average waiting time for access to a wavelength channel is negligible FIG. 5 shows the relative utilization for all the wavelength channels and the average channel waiting times. It is evident from FIG. 5 that all wavelength channels are equally utilized, i.e. network operation is balanced and optimal. Each bandwidth request is satisfied with minimal latency.

Figure 6:
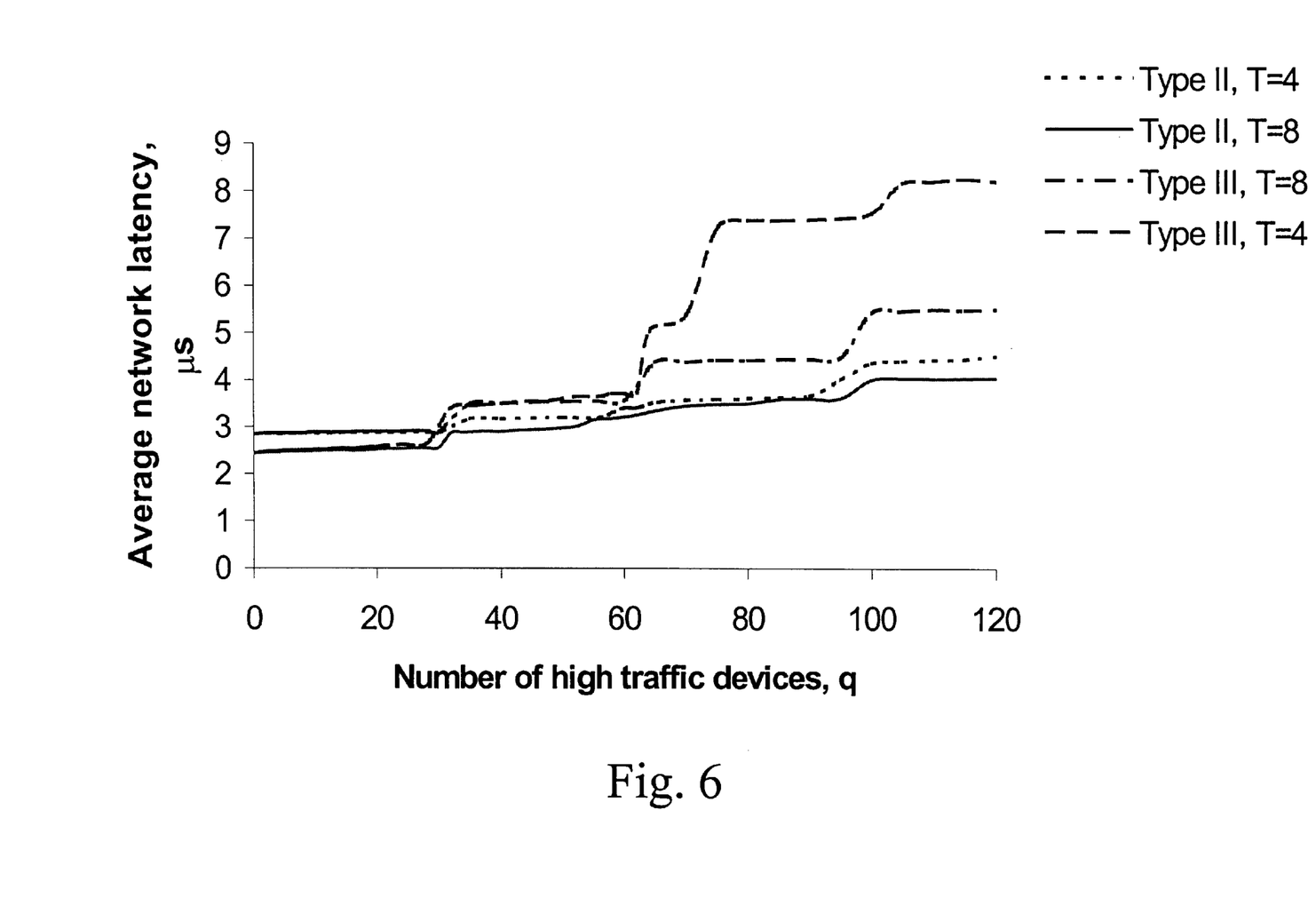
FIG. 6 is a graph of average network latency with increase in the number of high traffic devices.
Figure 7:
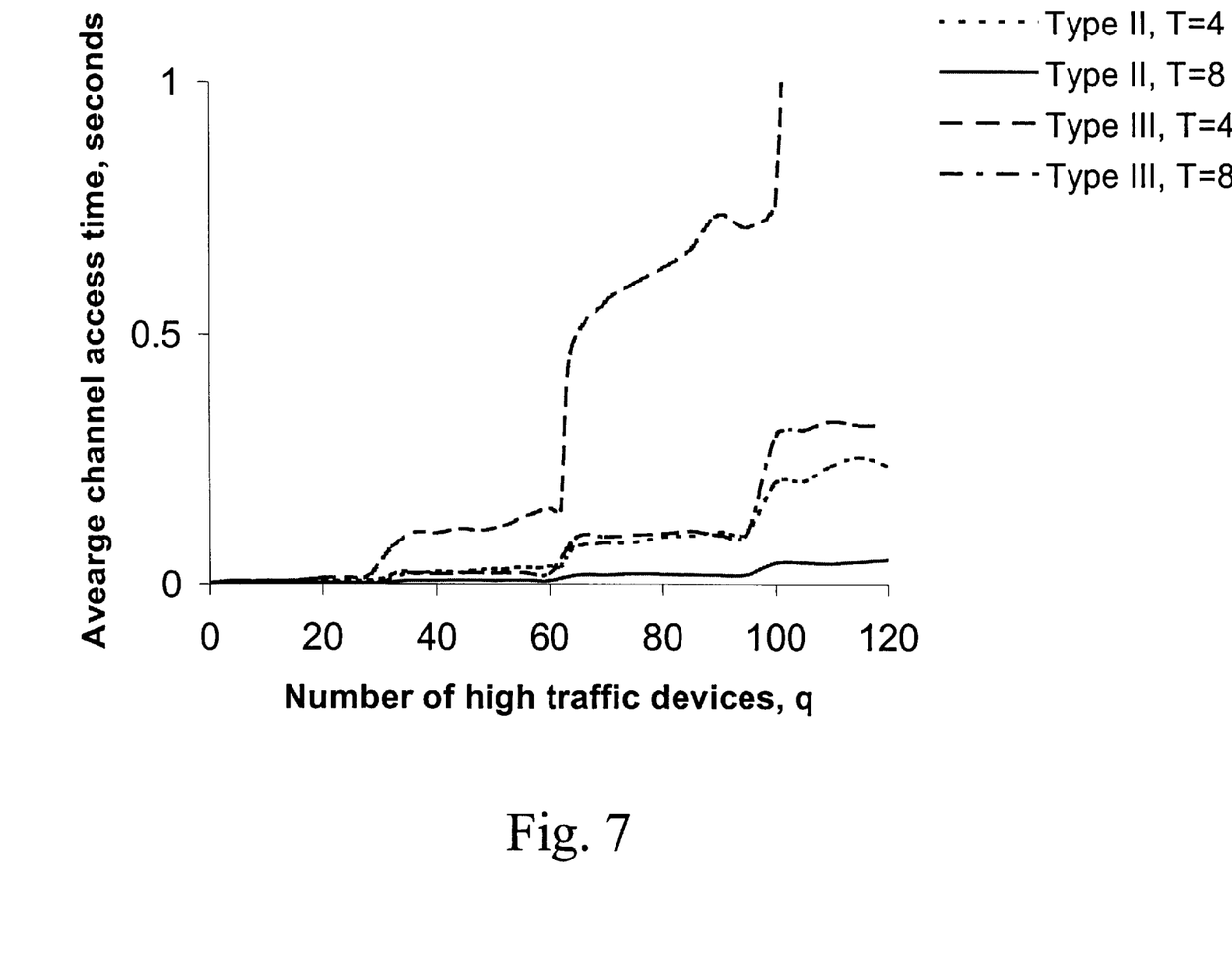
FIG. 7 is a graph of average channel access time with increase in the number of high traffic devices.

Case 2 was simulated for T=4, N=32, W=R=32, X=2 sec., q devices in the network make requests to transmit large amounts of data, following traffic type II or III, which momentarily overload the network. The remaining (N*C−q) devices follow traffic type I. Traffic type I is considered as the normal traffic pattern at a device, type II and III traffic lead to randomly overloading the network. The devices overloading the network are distributed uniformly among the nodes. FIGS. 6 and 7 show the increasing average latency and channel access wait time in the network as the number of overloaded devices is increased. From FIG. 6, it is evident that for moderate loading of the network with type II traffic, $q \leq 60$, the average network latency remains low. As the number of type II devices increases so does the average network latency. This result is related to the timeout, When a type II traffic device uses a non-priority channel, it releases it upon a timeout. In order to complete its data transmission it is sometimes necessary to acquire another wavelength channel. This involves a reconnection request through the fibre channel interface with 2 $\mu$s connection setup time that contributes to the overall transmission latency. As expected when a large number of devices simultaneously overload the network with either type II or type III traffic patterns the latency as shown in FIG. 6 and average access time as shown in FIG. 7 increase dramatically. However, using the above-described protocol the network effectively handles periods of high data traffic demand made by a few devices. Use of multiple laser transmitters at each node enables the network to be significantly overloaded while keeping an average latency low as shown below in case 3. FIGS. 6 and 7 show results for both 4 and 8 transmitters per node. In all cases modeled the latency is lower for the 8 transmitter case compared to 4 transmitters per node. Similarly the average access time is higher in the case of traffic of type III with T=4 than traffic of type III with T=8.

If a node priority channel is acquired by another node, then the devices at the node either find another idle wavelength channel or wait to reacquire the priority wavelength. This introduces an increased channel access time for devices at the node. This is shown in FIG. 7 where the average wait times increase with increases in the number of high traffic devices, or equivalently bandwidth demand. Choice of timeout value has a large impact on the network performance and is commonly chosen to meet design requirements for a particular application environment. In general, a small value for timeout leads to many reconnections with greater impact on network latency. A large timeout value allows most devices to complete their data transfer in a single connection at the expense of increased access time leading to node starvation. The fluctuation and periodic increases in the network latency shown in FIG. 6 with increase in the number of high traffic devices are likely due to channel timeout. The best value of channel timeout for optimal network performance depends on a particular application environment. For applications with continuous bit rate (CBR) and variable bit rate (VBR) traffic, different timeout values are used to achieve optimal performance. However, results for the proposed architecture show that it deals effectively with periods of traffic overload, i.e. when a few devices at the network nodes demand high bandwidth. This a significant advantage of the architecture allowing a number of VBR traffic based real-time applications to operate over the network concurrently with real-time applications without degrading the network performance. Examples of applications include RADAR processing which operates with CBR traffic.

Figure 8:
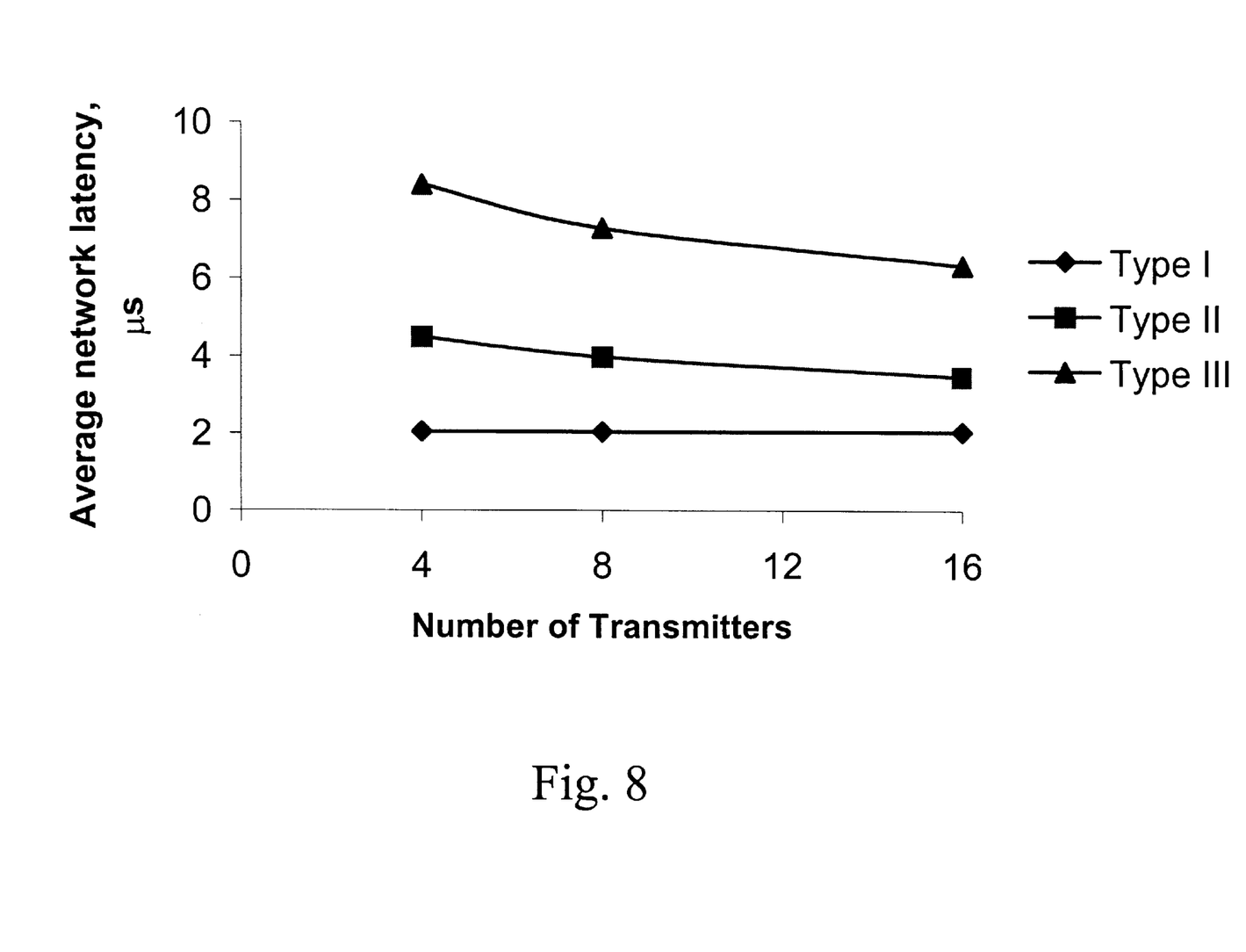
FIG. 8 is a graph of the average network latency with increasing numbers of transmitters per node; and, FIG. 9 is a simplified diagram of a test system comprising two nodes and a star coupler according to the invention.

Case 3 was simulated for T=4, 8, 16, N=32, W=R=32, x=2 sec and all devices with traffic types I, II, and Ill. Here the effectiveness of multiple transmitters at each node is shown as the number of transmitters is increased at each node (T=4, 8, 16) for all three traffic types. FIG. 8 show the average node latency in the network decreases in all cases with an increase in the number of transmit wavelengths.

Physical Prototype

Figure 9:
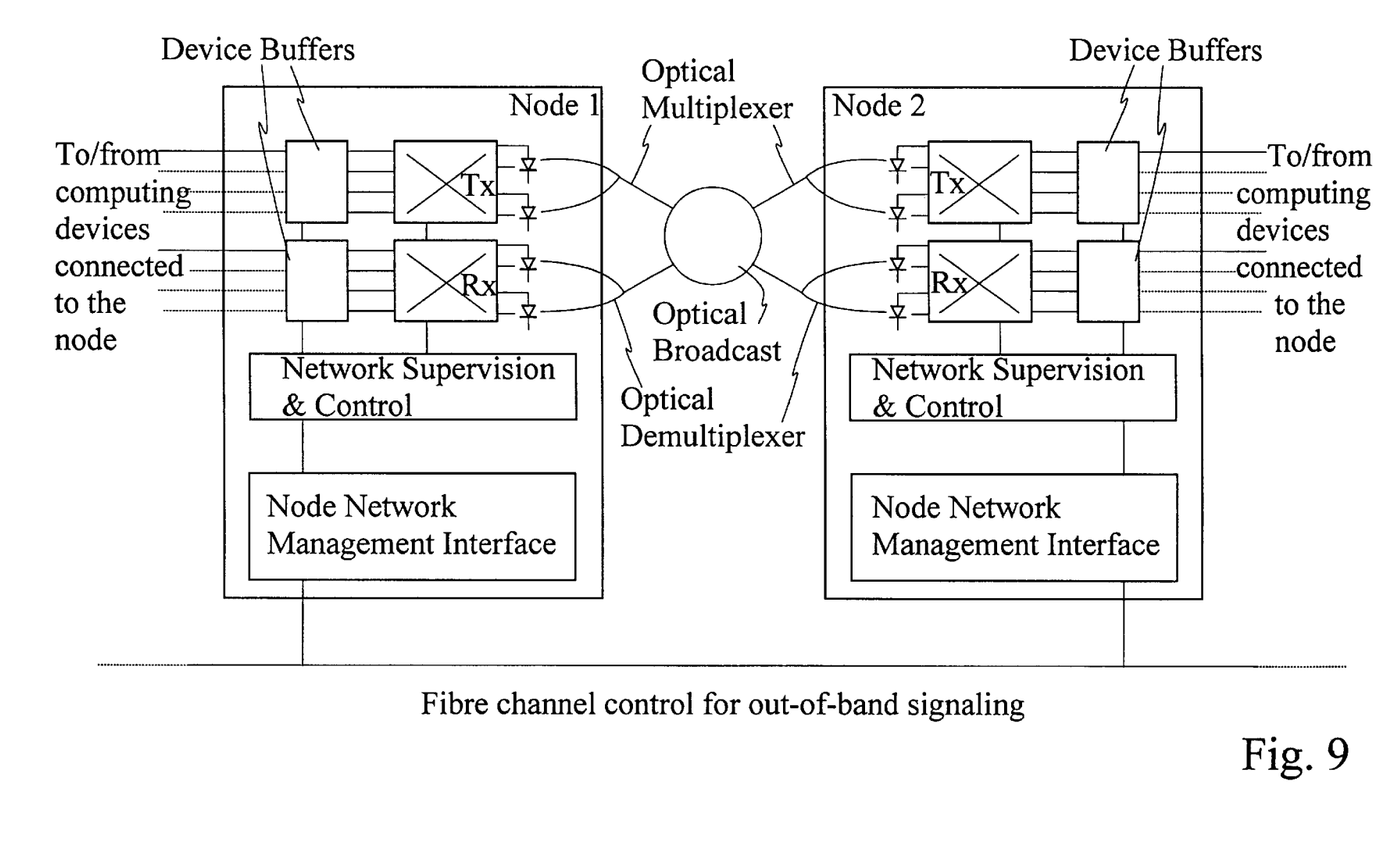

Referring to FIG. 9, a test system architecture was implemented incorporating software and hardware components according to the invention. Two node interfaces have been implemented, N=2, T=2, W=R=2, for simultaneous bi-directional communication between the nodes. The test system was configured similarly to the description above and similar to the network architecture systems that were modeled. A number of subsystems and devices are connected to the nodes. The network operated within expected performance results.

The transmitter for a node supports a plurality of transmit wavelengths. Typically the transmitter comprises a plurality of lasers, a single multi-laser module, a plurality of multi-laser modules, and so forth. The transmitter also comprises a WDM device for ensuring that a transmitted signal of any channel is routed to the fibre optic network. Conversely, the receiver within each node comprises a wavelength-filtering device for splitting a received signal into channelised signals. The channelised signals are each provided to a detector wherein they are detected and a corresponding electrical signal is provided. The electrical signals are then provided to an electrical switching fabric for rerouting of data to destination computing devices.

It is evident that the all-optical broadcast and select star network described above provides multi-Gbyte/sec bandwidth through wavelength division multiplexing when a plurality of transmit channels are available to each node within the network and each node is provided with a receiver for receiving some or, preferably, all channels within the network. Further, the use of a same transmit channel by each of two nodes is not prevented as long as that use is not simultaneous. In such a fashion, a single node is provided with a flexible amount of bandwidth dependent upon network traffic. When each node supports transmission at any of three or more wavelengths, the resulting system has even more flexibility and so forth. Because every node receives all wavelengths, it is straightforward to provide two or more channels of bandwidth to any node. Also, as long as network traffic allows, two or more channels of bandwidth are available from each node. This resulting flexibility is very advantageous.

According to another embodiment, each node is provided with a fixed set of transmit wavelengths. The nodes are programmable to indicate a default wavelength from amongst the fixed plurality of transmit wavelengths. Preferably, one wavelength is selectable as a default wavelength. Alternatively, a number of wavelengths are selectable as default wavelengths for a same node when some extra wavelength channels, not assigned as a default wavelength of any other node, are available.

According to a further embodiment of the invention, each node is provided with tunable transmitters. Tuning of the transmitters allows preselection of a set of transmit wavelengths for the node. Using such an embodiment, each node is identical providing an advantage of manufacturing scale. Once a node is deployed, its transmit frequency set is fixed for use in the network. Preferably, the node transmit frequencies are remotely reconfigurable such that a network can easily be reconfigured at any time. This allows provisioning of a network based on bandwidth requirements of nodes, fixed common wavelengths of different nodes, and data communication requirements on those wavelengths.

In yet another embodiment, the nodes are each provided with tunable lasers for supporting a fixed group of available wavelength sets. For example, when a WDM system has 32 available wavelengths and the known group comprises 32 sets of transmit wavelengths, each set is formed of one of the 32 wavelengths as a default or priority transmit wavelength and another of the 32 wavelengths as another transmit wavelength. Since the optical receivers receive all the 32 wavelengths, the nodes are easily configured to suit network needs. Optionally, the nodes are programmable remotely to facilitate network management.

Though the above network is described, modeled, and prototyped for a system area network, the above network architecture is applicable to broadband network architectures in general. The use of the present architecture is dictated by design requirements for any broadband network.

Numerous other embodiments can be envisaged without departing from the spirit or scope of the invention.

What is claimed is:

1. A communication node for use in a multi-wavelength optical communication network supporting communication at each of W wavelength wherein W>2, the node comprising:

an optical transmitter for simultaneously transmitting data at each of T wavelengths where T is less than or equal to the number W but greater than 1:

an optical receiver for simultaneously and individually receiving signals transmitted at more than one of a plurality of the W wavelengths; and, control logic for dynamically allocating a transmitter wavelength for use in providing a dedicated transmission channel from the node to another node within the optical communication network, the allocated transmitter wavelength corresponding to an unused wavelength from the W wavelengths.

2. A communication node as defined in claim 1 wherein the optical receiver is for simultaneously receiving signals transmitted at each of the W wavelengths.

3. A communication node as defined in claim 2 wherein the transmitter comprises at least a tunable laser for transmitting at a selectable wavelength from the W wavelengths, the selected wavelength for forming one of the T wavelengths.

4. A communication node as defined in claim 1 wherein the control logic includes:

a timer for measuring a time during which a transmit wavelength is allocated; and, means for, when the allocated wavelength is other than a default wavelength for the node, terminating the wavelength allocation upon expiry of the measured time.

5. A communication node as defined in claim 1 wherein the optical receiver comprises a filter, a detector for individually detecting a received signal at a single wavelength, and a switching fabric.

6. A communication node as defined in claim 5 wherein the optical transmitter comprises a single chip multi-laser module.

7. A communication node as defined in claim 5 wherein the optical transmitter comprises a plurality of lasers.

8. A communication node as defined in claim 1 wherein the control logic comprises means for providing data relating to unused transmit wavelengths, the transmit wavelengths unused by the node and by other nodes within the network.

9. A multi-wavelength optical communication network comprising:
a WDM communication network supporting communication in W wavelength channels where W>1;
a plurality of intercommunicating network nodes each including at least a transmitter for transmitting data via the WDM communication network at each of T wavelengths ($0<T\leq W$) and at least a receiver for simultaneously and individually receiving data transmitted via the WDM communication network on more than one fixed wavelength of the W wavelengths, some nodes having transmitters for transmitting at a same wavelength, and a controller for dynamically allocating a transmit wavelength to a node within the plurality of intercommunicating network nodes.

10. A multi-wavelength optical communication network as defined in claim 9 wherein the at least a receiver is for receiving data transmitted at each of W wavelengths.

11. A multi-wavelength optical communication network as defined in claim 9 wherein two nodes each comprise transmitters for transmitting at two or more fixed wavelengths including at least a common wavelength and at least a wavelength that is not common.

12. A multi-wavelength optical communication network as defined in claim 11 wherein one of the two nodes is provided with default status on the common wavelength.

13. A multi-wavelength optical communication network as defined in claim 12 wherein one of the two nodes comprises a timer for measuring a duration of allocation of a wavelength other than a default wavelength and for releasing the allocated wavelength upon expiration of a predetermined duration.

14. A multi-wavelength optical communication network as defined in claim 12 wherein a plurality of nodes each comprise substantially similar components configured differently such that the nodes transmit at different default wavelengths.

15. A multi-wavelength optical communication network as defined in claim 10 wherein the WDM network provides connectivity to C computing devices and wherein $T\geq C>0$.

16. A multi-wavelength optical communication network as defined in claim 11 wherein the at least a receiver comprises a wavelength filtering device; a detector; and a switching fabric for providing dynamic connections between wavelength channels to support multi-session connectivity between two computing devices at different nodes.

17. A multi-wavelength optical communication network as defined in claim 16 wherein the controller comprises means for determining free wavelength channels within the network and for processing requests for data bandwidth on the network.

18. A multi-wavelength optical communication network as defined in claim 9 wherein the controller comprises means for providing dynamic use of free channels to achieve connectivity from a first node to a second other node.

19. A multi-wavelength optical communication network as defined in claim 18 wherein the first node comprises means for transmitting data on each of two channels simultaneously, the data transmitted to the second other node.

20. A multi-wavelength optical communication network as defined in claim 18 wherein the first node comprises means for transmitting data on each of two channels simultaneously, the data on a channel from the two channels transmitted to the second other node and the data on the other channel from the two channels transmitted to a third other node.

21. A multi-wavelength optical communication network as defined in claim 9 wherein the at least a transmitter comprises a single chip multi-laser module.

22. A multi-wavelength optical communication network as defined in claim 9 wherein the at least a transmitter comprises a plurality of lasers.

23. A multi-wavelength optical communication network as defined in claim 11 wherein the controller comprises means for providing data relating to unused wavelength channels, the unused wavelength channels unused within the network.

24. A multi-wavelength optical communication network as defined in claim 9 wherein the controller comprises means for providing a dedicated high speed out of band signaling channel.

25. A method of providing an optical communication network comprising the steps of:
providing a WDM optical connection between each of a plurality of nodes;
providing plurality of intercommunicating network nodes each including a transmitter for transmitting data via the WDM communication network at each of T wavelengths ($0<T\leq W$) and a receiver for receiving data transmitted via the WDM communication network on each of W wavelengths, some nodes having transmitters for transmitting at a same wavelength;
dynamically allocating a transmit wavelength to a first node within the plurality of intercommunicating network nodes the transmit wavelength allocated in dependence upon free wavelengths and transmit wavelengths supported by the transmitter of the first node;
transmitting data from the first node to a second node at the allocated transmit wavelength; and,
receiving data at the second node at each of the W wavelengths and extracting data directed to the second node.

26. A method of providing an optical communication network as defined in claim 25 wherein the extracted data includes data received at the allocated transmit wavelength.

27. A method of providing an optical communication network as defined in claim 25 comprising the steps of:
when an allocated transmit wavelength is other than a default transmit wavelength for the node to which it is allocated, limiting the allocation time to a predetermined time, X, after which the allocation is revoked at least temporarily.

* * * * *